Aug. 14, 1951           J. SLANE           2,564,215

HEATING AND COOLING SYSTEM FOR BUILDINGS

Filed April 3, 1950

John Slane
INVENTOR

BY *C. A. Snow & Co.*
ATTORNEYS.

Patented Aug. 14, 1951

2,564,215

UNITED STATES PATENT OFFICE 2,564,215

HEATING AND COOLING SYSTEM FOR BUILDINGS

John Slane, San Antonio, Tex.

Application April 3, 1950, Serial No. 153,731

1 Claim. (Cl. 98—33)

This invention relates to a system for heating or cooling a building.

Mainly, the invention has reference to systems whereby fresh air, either heated or cooled as desired, can be supplied to the interior of small houses, to which the invention mainly has reference.

It is an important object of the invention to provide a system of the character described whereby, in summer, the interior of the structure can be cooled appreciably, by continually supplying thereto fresh cool air, in a novel manner to be described.

Another important object is to provide a system which is adapted to meet the object stated immediately above, but which is nevertheless readily convertible for winter use, for supplying heated air to the interior of the structure.

Still another important object is to provide a structure which will fulfill its intended functions with efficiency, and which nevertheless is capable of being installed at relatively low cost, and which, when installed, will have a low maintenance.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 1:
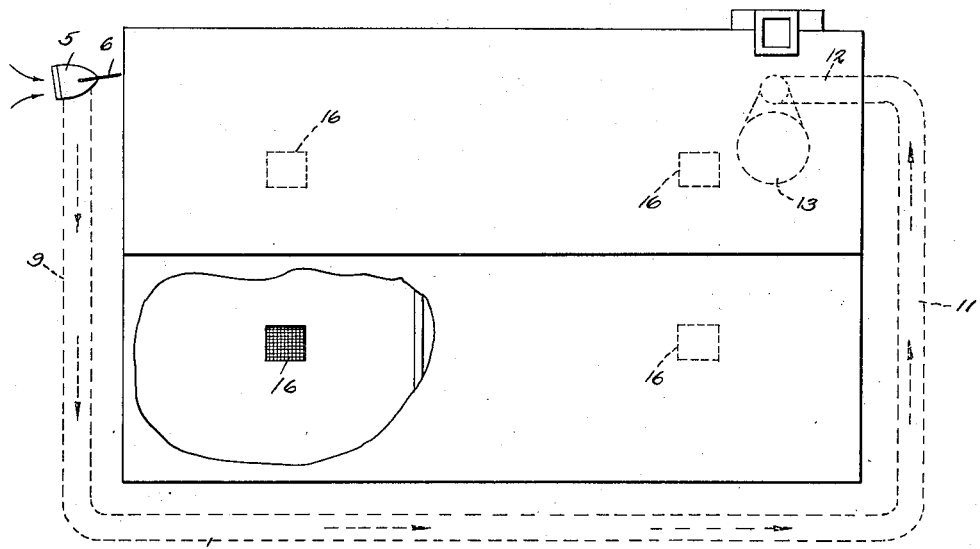
Figure 1 is a more or less diagrammatic illustration of a heating system as applied to a structure, said structure and heating system being shown in top plan with portions of the structure being broken away.

Referring to the drawings in detail, the reference numeral 5 designates an air intake member, here shown as a hood having the wind responsive vane 6 at one end, and the screened inlet opening 7 at the other end. The design of the air intake member can, I believe, be varied, it being mainly important to the invention that said air intake be located above ground level, and outside the building in which the air is to be supplied.

In the present instance, the air intake member is rotatably mounted on an upstanding inlet pipe 8, that projects from the ground, and which extends downwardly into the ground for a distance of, say, four feet more or less.

The inlet pipe 8 can be considered as part of a pipe system almost all of which is buried below ground, and in the construction of which is preferably utilized concrete or clay pipe, or pipe formed of some other material having the desired qualities of resistance to corrosion, and long life.

In any event, the intake pipe 8 merges at its lower end into pipe member 9, that extends horizontally well below the ground across one face of the building, said pipe 9 merging at its other end into pipe 10 extending across another face of the building, and pipe 10 merging into pipe 11 extending across still another face of the building. In this connection, the arrangement of the pipes may be varied, and it is not absolutely critical to the invention that the pipes extend around the building as illustrated in Fig. 1, it being quite possible to locate the intake well away from the house, and to extend the pipe system directly from the intake to the house or other building to be heated or cooled. The main importance in the pipe system derives from the fact that it is buried below ground, while its intake is above ground.

At the outlet end of the pipe system, pipe member 12 extends through the wall of the building into the basement or similar area, and preferably, said pipe 12 extends into the air chamber of a furnace 13, which can be gas fired, or fired by any other type of fuel. A hot air furnace is used, said furnaces commonly embodying an air chamber wholly separate from its fire box, the air chamber comprising a portion in which air is heated and transmitted by various means into the different rooms of the building.

From the air chamber of the furnace 13, the outlet for the air is into the flat enclosed open space 14 disposed under the ground floor of the building. Vent 15 opens from said space into a room of the building. Of course, any number of vents 15 can be used, depending on the number of rooms on the ground floor, or depending on the number of air intakes that it is desired to have in a particular room.

In the invention, ceiling vents 16 are formed in the ceiling of each room, these opening into the attic of the building. Attic fan 17 is mounted in said attic, this being positioned where it will draw air through the louver 18 and thence outside the building.

Use of the arrangement for cooling the building in summer may now be noted. The furnace 13 is of course in this event not used, but the air can be passed through the air chamber of the furnace. In any event, the attic fan 17 is turned on, forcing air in the attic through the louver to the outside of the building. This tends to create a vacuum within the attic, causing air to be drawn up through the ceiling vents 16 as shown by the arrows. At this point, it may be noted that for cooling the house in summer, all windows and doors are preferably closed.

Figure 2:
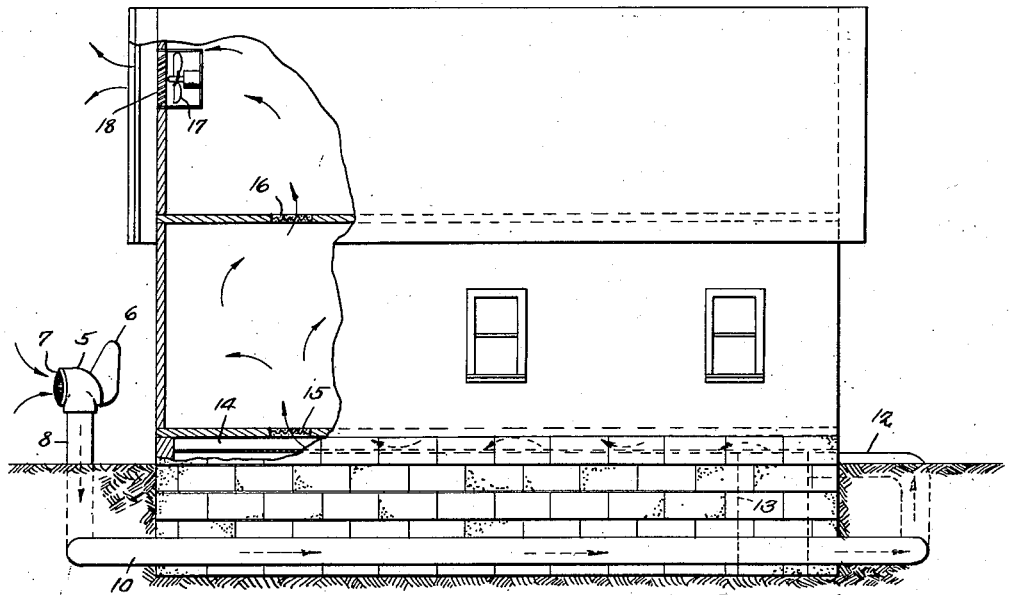
Figure 2 is a more or less diagrammatic view showing the invention in side elevation, portions being broken away.

Drawing of the air through the ceiling vent 16 tends to create, in turn, a vacuum condition on the first or ground floor of the building, and this in turn causes air to be drawn through the floor vent 15, out of the flat open space 14 under the ground floor. As a result, and as shown by the arrows in Fig. 2, air is drawn into said open space 14 from the pipe system previously described, with the air initially entering the pipe system through the air intake opening 7.

By reason of the circulatory system described, it will be readily observed that cool air that is always fresh will be continuously drawn into the building. This air will be kept quite cool, by reason of the fact that the warm air drawn into the air intake opening 7 will be cooled to a quite low and comfortable temperature, by its passage through the underground pipe system. This is by reason of the fact that the ground is quite cool, as compared to the outside air temperature, and tends to cool air within the pipe system. In this connection, I prefer that the concrete pipe system be bedded in sand or the like, and that this bed be wetted down, in unusually hot weather.

By reason of the arrangement illustrated and described, I believe it will be apparent that there will be continuously drawn into the house cool fresh air at a markedly lower temperature than that to be found outside. Yet, this is accomplished without the necessity of expensive air conditioning devices, the invention not requiring the use of special refrigerating apparatus, or devices having a great number of moving parts.

In use of the device for the purpose of heating a building in winter, I find that it is possible to either use the inlet pipe system, or not use it, as desired. If the pipe system is not to be used, it can be shut off from the air chamber of the furnace 13 by any well-known means, such as a damper or the like. However, it is not essential that the pipe system be closed off from the furnace, because it may be desired that fresh outside air be used as the air to be heated.

For use of the system for heating, the attic fan would be cut off, and the ceiling vent into the attic would be closed. The furnace can then be used with a conventional blower to blow hot air through the open space 14 under the floor, and thence through the floor vent 15.

What is claimed is:

In a building of the type having a ground floor, an enclosed space above the ground floor, an enclosed space below and coinciding in area to the ground floor, a ceiling above the ground floor, an enclosed attic above the ground floor, and a vent establishing communication between the attic and the atmosphere outside of the building, means for circulating air through the building comprising a heating unit having a jacket through which air passes to be warmed, said jacket opening into the space below the ground floor for discharging air entering said jacket into the said space, an air duct buried in the ground on the exterior of the building and opening into the jacket for admitting air to said jacket, a stand pipe connected to the duct and communicating with the duct and with atmosphere for admitting air to said duct, and a fan in the attic adjacent the vent for forcing air in said attic through said vent to atmosphere.

JOHN SLANE.

REFERENCES CITED

The following references are of record in the file of this patent:

UNITED STATES PATENTS

| Number | Name | Date |
|---|---|---|
| 706,451 | Rector | Aug. 5, 1902 |
| 1,297,633 | Ashley | Mar. 18, 1919 |
| 2,032,080 | Chance | Feb. 25, 1936 |
| 2,188,566 | Cowderoy-Dale | Jan. 30, 1940 |
| 2,210,960 | St. Pierre | Aug. 13, 1940 |
| 2,427,780 | Haines | Sept. 23, 1947 |
| 2,432,354 | Temple | Dec. 9, 1947 |
| 2,497,947 | Lewis | Feb. 21, 1950 |